United States Patent Office 3,801,496
Patented Apr. 2, 1974

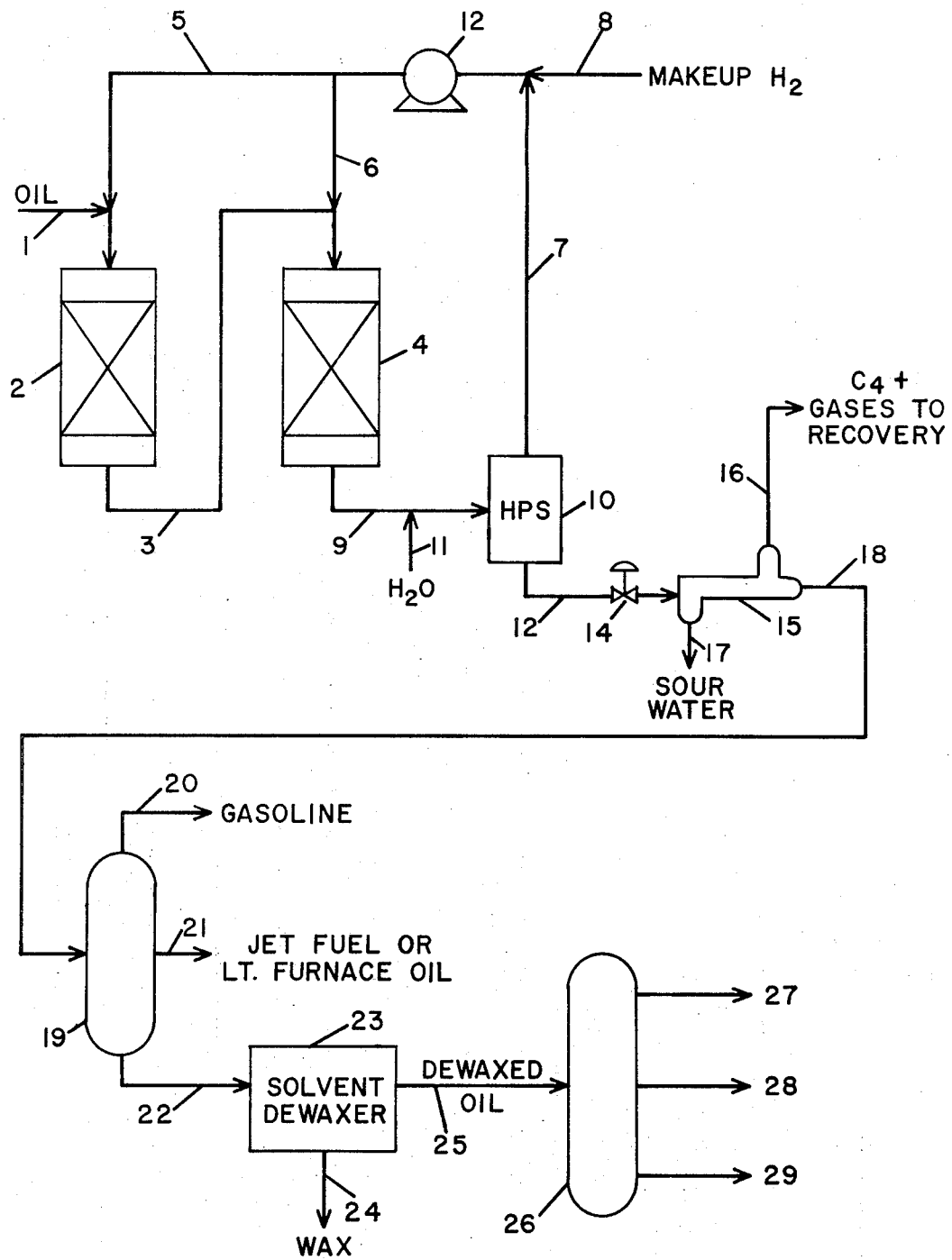

3,801,496
HYDROCRACKING TO PRODUCE LIGHT LUBES
Robert I. Benner, Upper Chichester, Pa., assignor to Sun Oil Company of Pennsylvania, Philadelphia, Pa.
Filed June 14, 1972, Ser. No. 262,889
Int. Cl. C10b 33/28; C10g 13/02, 37/10
U.S. Cl. 208—111
7 Claims

ABSTRACT OF THE DISCLOSURE

Hydrocracking gas oil using a palladium impregnated zeolite catalyst particularly Mg-H-zeolite Y, at from 650° F. to 725° F., from 1250 p.s.i.g. to 1750 p.s.i.g., a LHSV of 1.0 to 2, fractionating the thus produced hydrocrackate to provide a fuel fraction and a lube fraction, dewaxing the lube fraction, preferably by solvent dewaxing and recovering a lube boiling above 600° F. in at least a 20% yield, and more usually recovering a lube boiling above 650° F. in at least a 25% yield.

BACKGROUND OF THE INVENTION

In the past the hydrocracking of gas oil has been limited to fuel production and it has not been recognized that valuable light lubricating oils can be produced from such feedstocks.

SUMMARY OF THE INVENTION

The present invention relates to the discovery that by using the proper catalyst and operating conditions that high quality light lube oils can be obtained from petroleum gas oil charge stocks through hydrocracking. The catalyst used in the present invention is a zeolite in which palladium has atomically displaced some of the metal ions normally associated with the zeolite.

DESCRIPTION OF THE DRAWING

The drawing is an overall flowsheet of the present invention.

A heavy gas oil in line 1 is fed to a pretreat reactor 2 to convert undesirable materials such as nitrogen and sulfur into NH$_3$ and H$_2$S by hydrogenation which can be later removed from the product. The pretreated gas oil is then fed by line 3 to hydrocracker 4. Hydrogen is recycled through pretreat reactor 2 by means of hydrogen recycle line 5. Hydrogen is recycled through hydrocracker 4 by means of hydrogen recycle line 6. Hydrogen is supplied to hydrogen recycle line 5 and hydrogen recycle line 6 by means of line 7. Makeup hydrogen is supplied to hydrogen recycle line 6 by means of line 8. Hydrocrackate is removed from hydrocracker 4 by means of line 9 to high pressure separator 10. Water is injected into line 9 as stream 11. Hydrogen is removed from high pressure separator 10 by means of line 7 and recycled by compressor 12. The effluent from high pressure separator 10 is removed by means of line 12 and reduced in pressure through control valve 14. Vessel 15 is a gas-oil-water separator. Gases leave by line 16 to a recovery section. Sour water containing H$_2$S and NH$_3$ is removed by means of line 17. Oil is sent to distillation column 19 by line 18 for fractionation into gasoline stream 20, jet fuel or light furnace oil stream 21 and lube oil stream 22. Lube oil stream 22 is fed to a solvent dewaxer 23 wherein wax is removed as stream 24. Dewaxed oil is fed by line 25 to distillation column 26 and fractionated into a plurality of lube cuts 27, 28, and 29.

DESCRIPTION OF THE INVENTION

The present invention provides a process for producing high quality light lube oils from gas oil feedstocks. Generally suitable feedstocks for use in the present invention have about a 5% boiling point in the range of from 475° F. to 575° F. and a 95% boiling point in the range of from 750° F. to 850° F. Generally the feedstock will contain from 65 to 80 weight percent saturates. The preferred catalysts comprise crystalline, siliceous zeolites, sometimes referred to in the art as molecular sieves, which contain silica, alumina and one or more exchangeable cations such as hydrogen, magnesium, rare earth metals. These zeolites are further characterized by having crystal pores of relatively uniform diameter between about 4 and 14 angstroms. Suitable zeolites include for example synthetic molecular sieves A, L, S, T, X and Y and natural zeolites such as chabazite, mordenite, etc. It is preferred to employ zeolite Y.

The naturally occurring molecular sieves are usually found in a sodium form, or an alkaline earth form or mixed forms. The synthetic molecular sieves normally are prepared first in the sodium form. In any case for use herein it is preferred that most or all of the original monovalent metals be ion exchanged out with a polyvalent metal. The preferred polyvalent metal for this purpose is magnesium. Following this the zeolite is impregnated with from 0.2 to 2 weight percent of a noble metal, of which palladium is preferred. The noble metal may either be simply impregnated on the zeolite or ion exchanged or followed by a hydrogen treatment at elevated temperature to reduce the palladium to the free metal state. After ion exchange and impregnation, etc., the catalyst should be calcined in an oxygen atmosphere such as air or oxygen for a moderate period of time such as an hour at a temperature of from 700 to 1200° F. The catalyst may be used in undiluted form, or the powdered catalyst may be mixed and compelletized with diluents such as alumina, silica gel, coprecipitated silica gel, etc. The preferred catalyst is zeolite Y which has been ion exchanged with magnesium and then ion exchanged with palladium.

These catalysts are poisoned by both sulfur and nitrogen. Therefore if the gas oil feedstock contains more than about 10 p.p.m. of nitrogen or more than about 100 p.p.m of sulfur it is desirable to pretreat the gas oil prior to hydrocracking in order to increase the life of the hydrocracking catalyst. The pretreat step serves to convert the sulfur present into hydrogen sulfide and the nitrogen present into ammonia. Neither hydrogen sulfide nor ammonia in moderate amounts have a deleterious effect on the hydrocracking catalyst. Generally the catalyst used in the pretreat reactor is from 0.5 to 10% by weight nickel or cobalt and from 0.5 to 10% by weight molybdenum or tungsten supported on silica or silica alumina. The preferred catalyst is nickel-molybdenum. Generally the pretreat reactor is operated at 680 to 780° F., from 800 to 2000 p.s.i. with a gas oil feed rate of from 0.5–5 LHSV and a hydrogen recycle feed rate of from 1000 to 10,000 s.c.f. of hydrogen per barrel of gas oil feed.

After being pretreated the gas oil is fed to the hydrocracker, where the hydrocracking is carried out at from 650° F. to 750° F. and preferably 685° F. to 715° F. in order to optimize the amount of product oil obtained and its quality. Suitable pressures are from 1250 p.s.i.g. to 1750 p.s.i.g. Suitable space rates are from 0.5 to 3.0 LHSV. Generally the hydrogen recycle rate in the hydrocracker is from 3,000 to 13,000 s.c.f. of hydrogen per barrel of gas oil feed. By using the catalyst and conditions described above the hydrocracker from the hydrocracker is found to be very high in saturates as compared with the feed and further only a small amount of the original feed is cracked to below the lube oil boiling range.

The hydrocrackate is then fractionated as by distillation to separate the lube oil fraction from the lighter fractions. Generally the cut point between the lube oil and lighter fractions is from 550–650° F.

The lube oil fraction is then dewaxed. While any of the conventional dewaxing techniques may be used, solvent dewaxing is preferred because it is generally more economical. Generally the solvent dewaxing involves dissolving the oil to be dewaxed in a solvent which rejects the wax upon cooling to a suitable temperature followed by filtration. Suitable solvents are methyl ethyl ketone and mixtures thereof with benzene and/or toluene. Other solvent systems such as benzene/toluene, liquid sulfur dioxide/benzene or ethylene dichloride/benzene may also be used. Generally a solvent dosage of from 4:1 to 10:1 solvent: oil is used. Generally the solvent-oil mixture is cooled to from −10 to +10° F. to cause the wax to separate.

After dewaxing the oil is generally fractionated into a plurality of cuts depending on the intended use of the oil.

Generally the process of the present invention produces at least about 20% oil boiling above 600° F. as based on the original feed and more usually will produce at least 25% oil boiling above 650° F. as based on the original feed. The product oils are highly saturated and have a high viscosity index (VI). Generally the product oils contain at least 95% saturates and have a VI of at least 93.

DESCRIPTION OF THE PREFERRED EMBODIMENT

A blend of 56.6% of a fresh gas oil and 45.4% of a light vacuum gas oil is charged to a pretreat reactor. The blend has a gravity of 30.5 API, a viscosity of 66 SUS at 100° F. and 35.5 SUS at 210° F., contains 86.61% carbon and 13.13% hydrogen, 250 p.p.m. nitrogen and 1600 p.pm. sulfur. The blend contains 29.4 weight percent aromatics which have an average molecular weight of 271 and 70.6 weight percent saturates. The initial boiling point is 170° F., the 5% boiling point is 506° F., 95% boiling point is 830° F. and the end point is 870° F. with a 98% recovery. The gas oil feedstock is fed to a pretreater operated at 700° F. under a pressure of 1500 p.s.i. at a LHSV of 2. The catalyst is sulfided nickel oxide molybdenum oxide supported on alumina. Hydrogen gas is recycled through the reactor at a rate of 5000 s.c.f. per barrel of gas oil feed. The pretreated gas oil is then fed to a hydrocracker. The hydrocracker is operated at 695° F. and 1550 p.s.i.g. with a LHSV of 1.3. The catalyst is magnesium zeolite Y containing 0.5% atomically displaced palladium. Hydrogen is continuously fed to the system and recycled at a rate of 9000 s.c.f./bbl./hr. Water is mixed with the hydrocrackate effluent from the hydrocracker to remove $H_2S$ and $NH_3$ and the mixture fed to a high pressure separator operated at 1500 p.s.i. and 100° F. Hydrogen gas is removed from the top of the separator and fed to the hydrogen recycle stream of the hydrocracker along with whatever fresh makeup hydrogen is required. The hydrocrackate is fed into a gas-oil-water separator where some water containing the $H_2S$ and $NH_3$ is removed and the $C_4$ and lighter hydrocarbons are removed. The hydrocrackate is fed to a distillation column where it is distilled to provide a 60% yield of material boiling below 480° F. the portion of which boiling below 360° F. is useful as a blending component in gasoline and the portion boiling in the range of 360–480° F. is useful as a jet fuel or furnace oil. The remaining 40% of the material from the hydrocracker (cycle oil) has an API gravity of 45.1 and contains 96 weight percent saturates. This cycle oil is solvent dewaxed at 0° F. using a solvent to oil ratio of 6:1.

The solvent used is 50 volume percent methyl ethyl ketone, 17 volume percent toluene and 33 volume percent benzene. The solvent dewaxed oil is fractionated into four 10% cuts. The properties of the highest boiling three 10% cuts are reported in the table.

TABLE

| VBR cut | B.R., ° F. | ° API | Viscosity, SUS at 100° F. | V.I. |
|---|---|---|---|---|
| 70–80% | 664–704 | 39.0 | 53.0 | 94 |
| 80–90% | 704–748 | 35.8 | 77.2 | 95 |
| 90–100% | 748–796 | 31.9 | 206.8 | 96 |

The high saturate content of the cycle oil and the high viscosity index of the individual cuts indicate that these lube cuts are useful for white oil and spray oil manufacture.

The invention claimed is:

1. A process comprising charging a petroleum feedstock boiling principally in the range of from 475° F. to 575° F. up to 750° F. to 850° F. to an essentially once through hydrocracking step at a LHSV of from about 0.5 to 3.0 using a temperature of from 650° F. to 750° F. and a pressure of from 1250 p.s.i.g., to 1750 p.s.i.g., using zeolite catalyst containing from 0.2 to 2.0% of palladium, to produce a hydrocrackate, fractionating said hydrocrackate into a fuel boiling below about 400–500° F. and an oil, dewaxing said oil and recovering dewaxed lube oil product boiling above about 600° F. in at least about a 20% yield as based on said petroleum feedstock.

2. The process of claim 1 wherein the petroleum feedstock contains from 20 to 35% aromatics and from 65 to 80% saturates.

3. The process of claim 2 wherein the dewaxed lube oil product has a viscosity index of at least 90.

4. The process of claim 3 wherein there is obtained at least 25% of dewaxed lube oil boiling above 650° F. as based on petroleum feedstock.

5. The process of claim 4 wherein the zeolite catalyst used is magnesium zeolite Y.

6. The process of claim 4 wherein the hydrocracking step is carried out at from about 685° F. to about 715° F.

7. The process of claim 5 wherein the hydrocracking step is carried out at from about 685° F. to about 715° F.

References Cited

UNITED STATES PATENTS

| | | | |
|---|---|---|---|
| 3,132,087 | 5/1964 | Kelley et al. | 208—60 |
| 3,546,098 | 12/1970 | Spars | 208—96 |
| 3,654,130 | 4/1972 | Voorhies et al. | 208—57 |
| 3,654,133 | 4/1972 | Olson | 208—59 |
| 3,658,689 | 4/1972 | Steinmetz et al. | 208—46 |
| 3,494,854 | 2/1970 | Gallagher et al. | 208—59 |
| 3,732,156 | 5/1973 | Bennett et al. | 208—111 |

DELBERT E. GANTZ, Primary Examiner

G. E. SCHMITKONS, Assistant Examiner

U.S. Cl. X.R.

208—Dig. 2, 18